(12) United States Patent
Fukawatase et al.

(10) Patent No.: US 9,994,186 B2
(45) Date of Patent: Jun. 12, 2018

(54) AUTOMOBILE OCCUPANT PROTECTION DEVICE

(71) Applicant: Toyota Jidosha Kabushiki Kaisha, Toyota-shi Aichi-ken (JP)

(72) Inventors: Osamu Fukawatase, Miyoshi (JP); Atsushi Nakashima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/264,133

(22) Filed: Sep. 13, 2016

(65) Prior Publication Data
US 2017/0072896 A1    Mar. 16, 2017

(30) Foreign Application Priority Data
Sep. 15, 2015 (JP) ................................. 2015-182329

(51) Int. Cl.
*B60R 21/231* (2011.01)
*B60R 21/232* (2011.01)
(Continued)

(52) U.S. Cl.
CPC .......... *B60R 21/232* (2013.01); *B60R 21/203* (2013.01); *B60R 21/213* (2013.01);
(Continued)

(58) Field of Classification Search
CPC ........ B60R 2021/23107; B60R 21/203; B60R 21/213; B60R 21/232; B60R 21/23138
See application file for complete search history.

(56) References Cited

U.S. PATENT DOCUMENTS 8,899,617 B2 * 12/2014 Fukawatase .......... B60R 21/232
                                                                   280/730.2
2012/0248751 A1    10/2012 Kato et al.
(Continued)

FOREIGN PATENT DOCUMENTS

JP        2012-201312 A    10/2012
JP           5637192 B2    12/2014
(Continued)

OTHER PUBLICATIONS

Hiruta et al., Passenger Retaining Apparatus, JPO, JP 2014-240098, Entire Document of patent application.*
(Continued)

*Primary Examiner* — James A English
(74) *Attorney, Agent, or Firm* — Dinsmore & Shohl LLP

(57) ABSTRACT

An automobile occupant protection device is provided including: a driver's seat airbag; and a curtain airbag that is configured including a main chamber, an auxiliary chamber that is provided at a vehicle front side of the main chamber and that is disposed at a position bent toward the vehicle width direction inner side with respect to the main chamber as viewed along a vehicle up-down direction from inside the vehicle cabin, a non-inflating portion that is disposed between the main chamber and the auxiliary chamber, and a first gas supply path that is capable of supplying gas from the main chamber to the auxiliary chamber. The non-inflating portion is disposed at a position facing, in the vehicle width direction, a maximum external diameter portion of the driver's seat airbag where an external diameter of the driver's seat airbag is largest.

7 Claims, 10 Drawing Sheets

(51) Int. Cl.
  *B60R 21/203*  (2006.01)
  *B60R 21/213*  (2011.01)
(52) U.S. Cl.
  CPC ...... *B60R 21/231* (2013.01); *B60R 21/23138* (2013.01); *B60R 2021/23107* (2013.01); *B60R 2021/23192* (2013.01)

(56) References Cited

U.S. PATENT DOCUMENTS

| | | | | |
|---|---|---|---|---|
| 2014/0042732 A1* | 2/2014 | Taguchi | ................ | B60R 21/233 280/729 |
| 2014/0203541 A1* | 7/2014 | Wei | ...................... | B60R 21/213 280/730.2 |
| 2014/0217710 A1* | 8/2014 | Fukawatase | .......... | B60R 21/233 280/730.2 |
| 2014/0239619 A1* | 8/2014 | Fukawatase | .......... | B60R 21/232 280/730.2 |
| 2014/0361521 A1* | 12/2014 | Fukawatase | .......... | B60R 21/231 280/730.1 |
| 2014/0375033 A1* | 12/2014 | Fukawatase | .......... | B60R 21/214 280/729 |
| 2015/0054267 A1* | 2/2015 | Komamura | ........... | B60R 21/276 280/735 |
| 2016/0023626 A1* | 1/2016 | Hiruta | ................... | B60R 21/232 280/728.2 |
| 2016/0185314 A1* | 6/2016 | Kawamura | ........... | B60R 21/232 280/728.2 |
| 2016/0200281 A1* | 7/2016 | Takeshita | .............. | B60R 21/233 280/730.2 |

FOREIGN PATENT DOCUMENTS

JP    2015-040017 A    3/2015
WO    2012/111073 A1   8/2012

OTHER PUBLICATIONS

Hiruta et al., Passenger Retaining Apparatus, JPO, JP 2014-149894, Entire Document of patent application.*

* cited by examiner

AUTOMOBILE OCCUPANT PROTECTION DEVICE

CROSS-REFERENCE TO RELATED APPLICATION

This application is based on and claims priority under 35 USC 119 from Japanese Patent Application No. 2015-182329 filed on Sep. 15, 2015, the disclosure of which is incorporated by reference herein.

BACKGROUND

Technical Field

The present disclosure relates to an automobile occupant protection device.

Related Art

Japanese Patent No. 5637192 describes an example of a vehicle curtain airbag device. Described briefly, this vehicle curtain airbag device includes a main chamber that protects the head of a seated occupant in a side-on collision, a delay chamber that is disposed at a vehicle front side of the main chamber and that inflates and deploys later than the main chamber, and a sub chamber that is disposed at a vehicle width direction inner side of the main chamber and that inflates and deploys so as to block off a gap formed between a driver's seat airbag and the main chamber. In the above configuration, in the event of a small overlap collision, both the vehicle curtain airbag device and a driver's seat airbag device actuate, and in the event of a rollover, only the vehicle curtain airbag device actuates. The head of the seated occupant is thereby protected whether in the event of a small overlap collision or in the event of a rollover.

Note that in the related art described above, to attempt to enhance protection performance for the head of the seated occupant in the event of a collision at an angle, and in particular in the event of an oblique collision, it would be necessary to increase the size of the driver's seat airbag and to increase the size of a front end chamber disposed at the vehicle front side of the curtain airbag. However, adopting such a countermeasure would give rise to the possibility of the driver's seat airbag and the curtain airbag interfering with each other during inflation and deployment, and so inflation and deployment states of both the driver's seat airbag and the curtain airbag may be unstable.

In consideration of the above circumstances, an object of the present disclosure is to obtain an automobile occupant protection device capable of improving protection performance for the head of a seated occupant by stabilizing inflation and deployment states of both a driver's seat airbag and a curtain airbag in the event of a collision at an angle, and in particular in the event of an oblique collision.

SUMMARY

An automobile occupant protection device of a first aspect includes: a driver's seat airbag that is provided at a steering wheel, and that is configured by a bag body that has a substantially flattened spherical shape in a state in which deployment has been completed in the event of a collision at an angle; and a curtain airbag that is provided behind a ceiling of a vehicle cabin and that includes: a main chamber configured by a bag body that has a curtain shape disposed at a vehicle width direction inner side of a side window on a driver's seat side in a state in which deployment has been completed in the event of a collision at an angle, an auxiliary chamber that is provided at a vehicle front side of the main chamber and that is disposed at a position bent toward the vehicle width direction inner side with respect to the main chamber as viewed along a vehicle up-down direction from an inner side of the vehicle cabin in a state in which deployment has been completed, a non-inflating portion that is disposed between the main chamber and the auxiliary chamber, and a first gas supply path that is provided at a vehicle up-down direction upper side of the non-inflating portion and that is capable of supplying gas from the main chamber to the auxiliary chamber; wherein the non-inflating portion is disposed at a position facing, in the vehicle width direction, a maximum external diameter portion of the driver's seat airbag at which an external diameter of the driver's seat airbag is largest.

According to the first aspect, in the event of a collision at an angle, and in particular, in the event of an oblique collision, both the driver's seat airbag and the curtain airbag are inflated and deployed. Note that in the curtain airbag, the main chamber inflates and deploys first, and then gas inside the main chamber is supplied to the auxiliary chamber through the first gas supply path. The auxiliary chamber accordingly inflates and deploys, and the auxiliary chamber is disposed at a position bent toward the vehicle width direction inner side with respect to the main chamber as viewed along the vehicle up-down direction from inside the vehicle cabin.

In the present disclosure, the non-inflating portion disposed between the main chamber and the auxiliary chamber is disposed at a position facing the maximum external diameter portion, where the external diameter of the driver's seat airbag is largest, in the vehicle width direction. A gap is thereby formed between the maximum external diameter portion of the driver's seat airbag and the non-inflating portion. As a result, mutual interference between the driver's seat airbag and the curtain airbag is suppressed even if the driver's seat airbag and the curtain airbag are increased in size as a countermeasure against collisions at an angle. The inflation and deployment states of both the driver's seat airbag and the curtain airbag are accordingly stable An automobile occupant protection device according to a second aspect is the automobile occupant protection device of the first aspect, wherein a second gas supply path that places the main chamber and the auxiliary chamber in communication with each other along a vehicle front-rear direction is provided at the curtain airbag at a vehicle lower side of the non-inflating portion.

Operation of the second aspect is as follows.

In the event of a collision at an angle, and in the event of an oblique collision in particular, the head of the seated occupant moves obliquely toward the vehicle front side and the vehicle width direction outer side under inertia. The head of the seated occupant therefore contacts the vicinity of an end portion on the vehicle width direction outer side of the driver's seat airbag.

If a gap present between a driver's seat airbag and a curtain airbag as a countermeasure against interference between the driver's seat airbag and the curtain airbag were too large, when restraining the head of the seated occupant with the driver's seat airbag in the event of a collision at an angle, the end portion on the vehicle width direction outer side of the driver's seat airbag would be pressed by the head of the seated occupant, and the driver's seat airbag would twist. As a result, the driver's seat airbag would not adequately exhibit its inherent head restraint performance, and restraint of the head of the seated occupant by the driver's seat airbag would be inefficient.

By contrast, in the present disclosure, the second gas supply path that places the main chamber and the auxiliary chamber in communication with each other along the vehicle front-rear direction is provided at the vehicle lower side of the non-inflating portion of the curtain airbag, such that the second gas supply path is present at a location where the gap described above would otherwise form. Accordingly, when the end portion on the vehicle width direction outer side of the driver's seat airbag is pressed by the head of the seated occupant, the auxiliary chamber of the curtain airbag at a back side (vehicle front side) of the end portion on the vehicle width direction outer side contacts a back face of the end portion on the vehicle width direction outer side at an early stage. The end portion on the vehicle width direction outer side of the driver's seat airbag is accordingly supported from the vehicle front side by the auxiliary chamber of the curtain airbag at an early stage, thereby suppressing the driver's seat airbag from twisting, and rapidly increasing a reaction force of the driver's seat airbag.

An automobile occupant protection device according to a third aspect is the automobile occupant protection device of the second aspect, wherein an end portion at a vehicle width direction outer side, of the maximum external diameter portion where the external diameter of the driver's seat airbag is largest, is disposed over the second gas supply path when the driver's seat airbag is viewed along the vehicle width direction from the inner side of the vehicle cabin.

According to the third aspect the end portion at the vehicle width direction outer side of the maximum external diameter portion, where the external diameter of the driver's seat airbag is largest, is disposed over the second gas supply path when the driver's seat airbag is viewed along the vehicle width direction from inside the vehicle cabin, thereby enabling the location where the external diameter is largest to be supported from the vehicle front side. The driver's seat airbag can accordingly be efficiently suppressed from twisting.

An automobile occupant protection device of a fourth aspect is the automobile occupant protection device of the second aspect or the third aspect, wherein, as viewed along the vehicle width direction from the inner side of the vehicle cabin, at least a portion of the second gas supply path is positioned further to the vehicle lower side than a door beltline of a side door on the driver's seat side.

According to the fourth aspect, as viewed along the vehicle width direction from inside the vehicle cabin, at least a portion of the second gas supply path is positioned further to the vehicle lower side than the door beltline of the side door on the driver's seat side. Accordingly, when the seated occupant gives the curtain airbag a hard push toward the vehicle width direction outer side, the curtain airbag can obtain a reaction force from a door trim in the vicinity of the beltline through the second gas supply path.

An automobile occupant protection device of a fifth aspect is the automobile occupant protection device of any one of the first aspect to the fourth aspect, wherein, as viewed along the vehicle width direction from the inner side of the vehicle cabin, a lower portion side of the auxiliary chamber in the vehicle up-down direction is provided with a lower side extension portion that is positioned further to a vehicle lower side than a door beltline of a side door on the driver's seat side.

According to the fifth aspect, when the seated occupant gives the curtain airbag a hard push toward the vehicle width direction outer side, the curtain airbag can obtain a reaction force from a door trim in the vicinity of the beltline through the lower side extension portion.

An automobile occupant protection device of a sixth aspect is the automobile occupant protection device of the fifth aspect, wherein a lower edge side of the main chamber in the vehicle up-down direction is formed with a recessed portion recessed toward a vehicle upper side and a vehicle rear side with respect to the lower side extension portion of the auxiliary chamber.

According to the sixth aspect, the lower edge side of the main chamber in the vehicle up-down direction is formed with the recessed portion recessed toward the vehicle upper side and the vehicle rear side with respect to the lower side extension portion of the auxiliary chamber. This thereby enables interference with an upper portion of a side airbag to be suppressed in cases in which a vehicle seat is installed with a side airbag device.

An automobile occupant protection device of a seventh aspect is the automobile occupant protection device of any one of the first aspect to the seventh aspect, wherein: the non-inflating portion is configured including a first non-inflating portion and a second non-inflating portion that are respectively formed in island shapes and disposed spaced apart from each other in the vehicle up-down direction, and a connecting portion that connects the first non-inflating portion and the second non-inflating portion together substantially in the vehicle up-down direction; and as viewed along the vehicle width direction from the inner side of the vehicle cabin, the first non-inflating portion is disposed further to the vehicle front side than the second non-inflating portion, and the connecting portion is disposed in a state inclined toward the vehicle front side with respect to the vehicle up-down direction.

Operation of the seventh aspect is as follows.

Generally speaking, increasing the size of the non-inflating portion reduces the amount of gas required, thereby enabling a reduction in cost. However, if the non-inflating portion is made too large, an area for protecting the head of the seated occupant is reduced.

Accordingly, in the present aspect, the non-inflating portion is configured by the first non-inflating portion and the second non-inflating portion that are respectively formed in island shapes, and by the connecting portion. As viewed along the vehicle width direction from inside the vehicle cabin, the first non-inflating portion is disposed further toward the vehicle front side than the second non-inflating portion, and the connecting portion is disposed in a state inclined toward the vehicle front side with respect to the vehicle up-down direction. This thereby enables a side-on collision head protection area to be secured at the vehicle rear side of the connecting portion when the seated occupant is a female of small physical build, and the vehicle seat has been slid to its frontmost position. Moreover, in cases in which the seated occupant is a male of standard physical build, in the event of a collision at an angle, and in particular in the event of an oblique collision, a region of the auxiliary chamber that supports the driver's seat airbag can be sufficiently inflated when the end portion on the vehicle width direction outer side of the driver's seat airbag is supported by the auxiliary chamber and restrains the head of the seated occupant.

As described above, the automobile occupant protection device of the first aspect exhibits the excellent advantageous effect of stabilizing the inflation and deployment states of both the driver's seat airbag and the curtain airbag in the event of a collision at an angle, and in particular in the event of an oblique collision, thereby enabling improved protection performance for the head of the seated occupant.

The automobile occupant protection device of the second aspect exhibits the excellent advantageous effect of enabling both stabilization of the inflation and deployment states of both the driver's seat airbag and the curtain airbag, and of efficiently restraining the head of the seated occupant.

The automobile occupant protection device of the third aspect exhibits the excellent advantageous effect of enabling the part of the advantageous effect of the second aspect relating to efficiently restraining the head of the seated occupant to be further enhanced.

The automobile occupant protection device of the fourth aspect exhibits the excellent advantageous effect of enabling ejection of the occupant from the vehicle to be effectively suppressed in the event of a collision at an angle, and in particular in the event of an oblique collision.

Similarly to the fourth aspect, the automobile occupant protection device of the fifth aspect exhibits the excellent advantageous effect of enabling ejection of the occupant from the vehicle to be effectively suppressed in the event of a collision at an angle, and in particular in the event of an oblique collision.

The automobile occupant protection device of the sixth aspect exhibits the excellent advantageous effect of enabling not only stabilization of the inflation and deployment states of the driver's seat airbag and the curtain airbag, but also stabilization of the inflation and deployment states of the curtain airbag and the side airbag in the event of a collision at an angle, and in particular in the event of an oblique collision.

The automobile occupant protection device of the seventh aspect exhibits the excellent advantageous effect of enabling high head protection performance to be maintained for occupants of various physical builds, while reducing the amount of gas needed to inflate and deploy the curtain airbag.

BRIEF DESCRIPTION OF THE DRAWINGS

Exemplary embodiments of the present disclosure will be described in detail based on the following figures, wherein:

FIG. 8B is a plan view cross-section taken along line 8B-8B in FIG. 8A, and is an explanatory diagram to explain an advantageous effect of an automobile occupant protection device according to the present exemplary embodiment;

DETAILED DESCRIPTION

Figure 1:
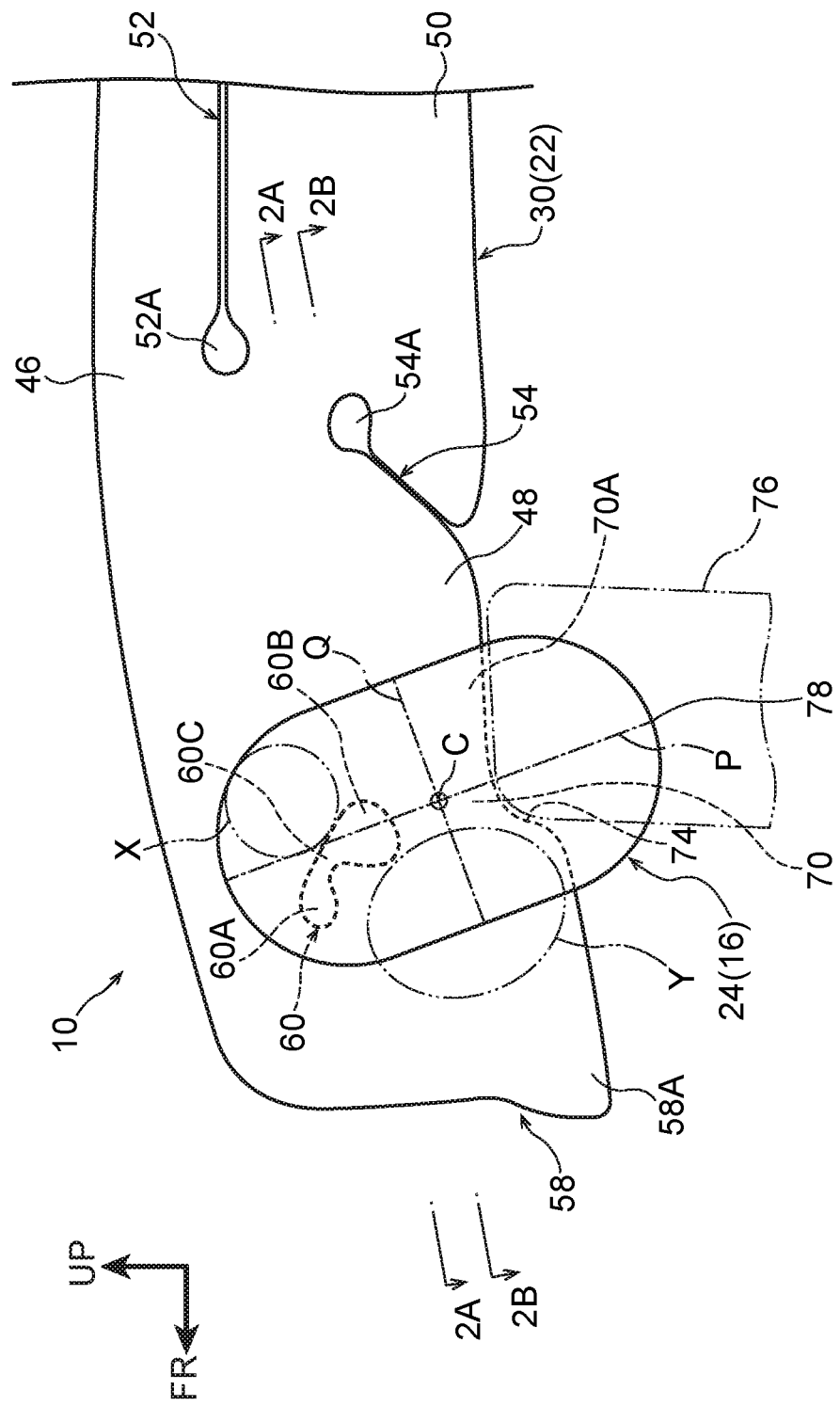
FIG. 1 is a side view as viewed along a vehicle width direction from inside a vehicle cabin, illustrating relevant portions of an automobile occupant protection device according to an exemplary embodiment in a state in which a curtain airbag and a driver's seat airbag have inflated and deployed.

Explanation follows regarding an automobile occupant protection device 10 according to an exemplary embodiment of the present disclosure, with reference to FIG. 1 to FIG. 10. Note that in the drawings, the arrow FR indicates a vehicle front side, the arrow UP indicates a vehicle upper side, and the arrow IN indicates a vehicle width direction inner side, as appropriate.

Figure 3:
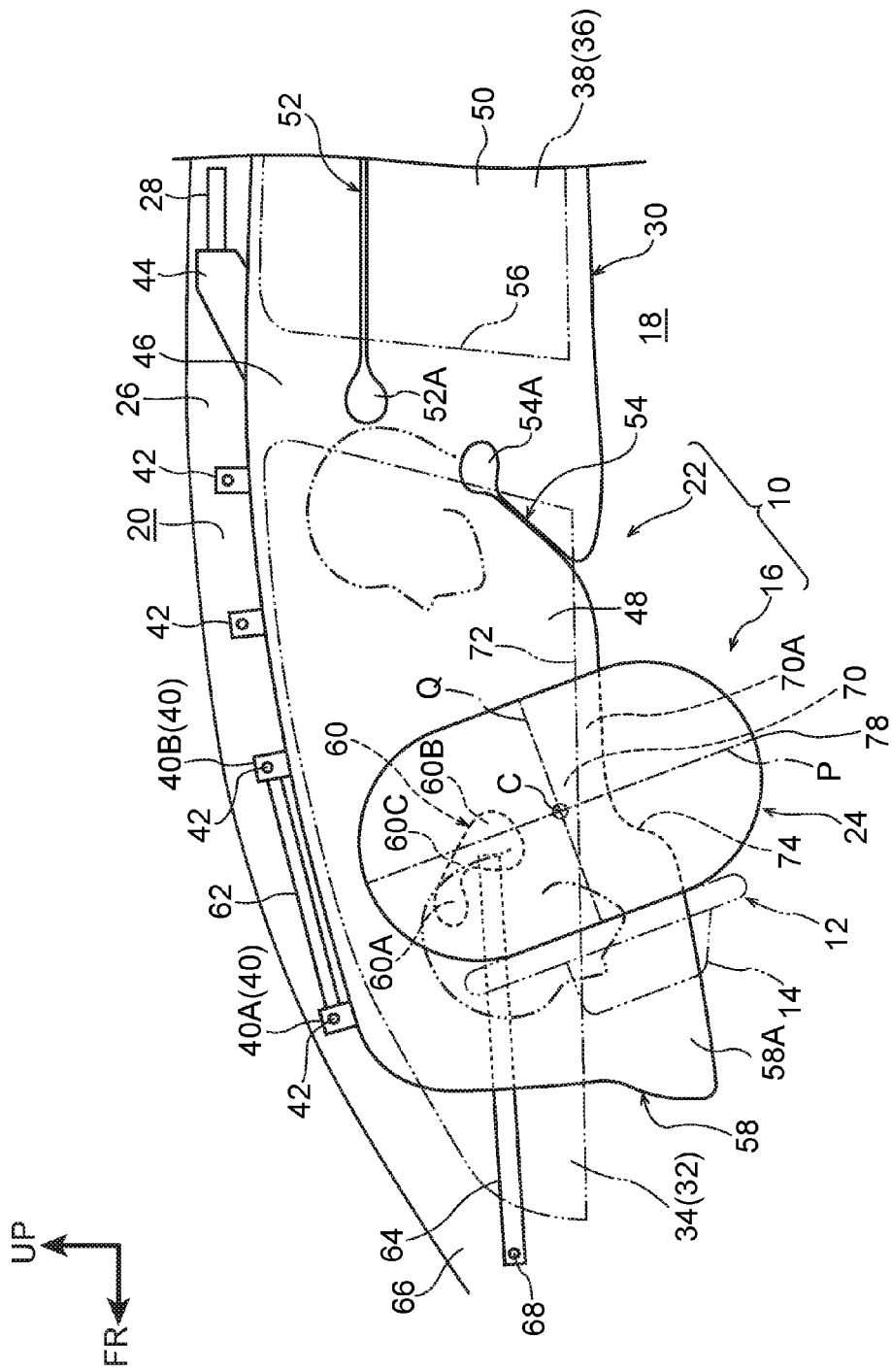
FIG. 3 is a side view as viewed along a vehicle width direction from inside a vehicle cabin, illustrating an actuated state of an automobile occupant protection device provided with the curtain airbag and the driver's seat airbag illustrated in FIG. 1.
Figure 4:
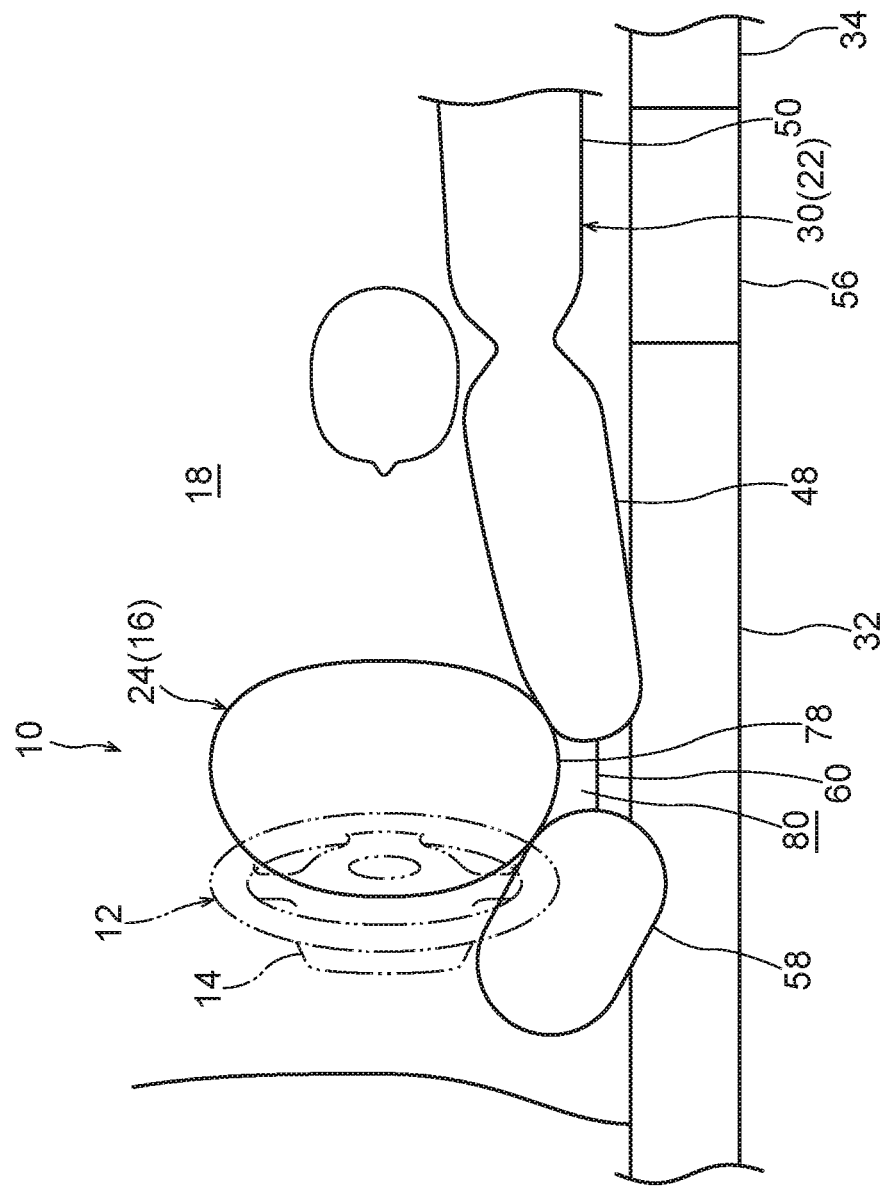
FIG. 4 is a schematic plan view illustrating the automobile occupant protection device illustrated in FIG. 1.

As illustrated in FIG. 3 and FIG. 4, the automobile occupant protection device 10 is configured by a driver's seat airbag device 16 provided to a wheel pad 14 of a steering wheel 12, and a curtain airbag device 22 provided at a vehicle width direction end portion side behind a ceiling 20 of a vehicle cabin 18.

The driver's seat airbag device 16 is configured by main elements of an inflator, not illustrated in the drawings, that is fixed to a base plate disposed inside the wheel pad 14, and that expels gas when actuated in a frontal collision, encompassing collisions at an angle, and a driver's seat airbag 24 that is housed in a folded state between the base plate and the wheel pad 14, and that is inflated and deployed by gas expelled from the inflator. A tear portion, not illustrated in the drawings, that splits when inflation pressure received from the driver's seat airbag 24 reaches a specific value is formed at a back face side of an occupant-facing top wall portion of the wheel pad 14. The driver's seat airbag 24 is configured by a bag body that has a substantially flattened spherical shape in a state in which deployment has completed.

The curtain airbag device 22 is configured by main elements of an inflator 28 that is fixed to a roof side rail 26 and that expels gas when actuated in a side-on collision, encompassing collisions at an angle, or in a rollover, and a curtain airbag 30 that is inflated and deployed in a curtain shape by gas expelled from the inflator 28.

The curtain airbag 30 is configured by a substantially rectangular bag shaped cloth member with a size capable of substantially covering both a side window 34 of a side door 32 on the driver's seat side (at the side of a front seat) and a side window 38 of a rear seat side door 36. Plural tags 40, each formed in a rectangular shape, are provided at an appropriate spacing at an upper edge portion of the curtain airbag 30. The tags 40 are fixed to the roof side rail 26 by attachment bolts 42 and weld nuts or clips, not illustrated in the drawings, so as to attach the curtain airbag 30 to the roof side rail 26 in a folded state. The curtain airbag 30 is stored at a back face side of a vehicle width direction outer side end portion of a roof headliner, not illustrated in the drawings, and during inflation and deployment, the curtain airbag 30 bends the vehicle width direction outer side end portion of the roof headliner toward the vehicle cabin inside, and inflates and deploys toward a vehicle lower side in a curtain shape.

Detailed explanation follows regarding configuration of the curtain airbag 30. Note that in the automobile occupant protection device 10 of the present exemplary embodiment, the relevant portions of the curtain airbag 30 are included in the configuration on a front seat (driver's seat) side, and so explanation regarding configuration at a rear seat side will be kept to a minimum.

As illustrated in FIG. 3, a fin shaped gas introduction portion 44 into which a leading end portion (gas expelling portion) of the inflator 28 is inserted is provided at a substantially central portion of an upper edge of the curtain airbag 30 described above. An upper edge side of the curtain airbag 30 is formed with a first gas supply path 46 that extends substantially along a vehicle front-rear direction and that is in communication with the gas introduction portion 44. Accordingly, gas expelled from the inflator 28 is introduced and supplied into the first gas supply path 46 through the gas introduction portion 44.

Moreover, a front side main chamber 48 that corresponds to a head protection area for an occupant sitting in the driver's seat is provided at a vehicle lower side of the first gas supply path 46 in the curtain airbag 30. The front side main chamber 48 corresponds to a "main chamber" of the present disclosure. Note that the curtain airbag 30 is also provided with a rear side main chamber 50 that corresponds to a head protection area for an occupant sitting in the rear seat. An upper portion side non-inflating portion 52 extending in the vehicle front-rear direction is formed by stitching an upper portion of the rear side main chamber 50, and the upper portion side non-inflating portion 52 partitions the first gas supply path 46 from the rear side main chamber 50 in a vehicle up-down direction. A lower portion side non-inflating portion 54 that extends diagonally toward a vehicle upper rear side from a substantially central portion of a lower edge is formed by stitching between the front side main chamber 48 and the rear side main chamber 50, and the lower portion side non-inflating portion 54 separates the front side main chamber 48 from the rear side main chamber 50 in the vehicle front-rear direction. Note that as viewed along the vehicle width direction from inside the vehicle cabin, a start end portion 52A of the upper portion side non-inflating portion 52 and a start end portion 54A of the lower portion side non-inflating portion 54 are both disposed at positions overlapping with a center pillar 56, and the two start end portions 52A, 54A are disposed spaced apart from each other by a specific distance in the vehicle up-down direction and in the vehicle front-rear direction.

An auxiliary chamber 58 adjacent to the front side main chamber 48 is provided at a vehicle front side of the front side main chamber 48 in the curtain airbag 30 described above. A front portion side non-inflating portion 60, serving as a "non-inflating portion", described later, is formed by stitching between the front side main chamber 48 and the auxiliary chamber 58. The front side main chamber 48 is partitioned from the auxiliary chamber 58 in the vehicle front-rear direction by the front portion side non-inflating portion 60.

The front portion side non-inflating portion 60 is configured including an upper side non-inflating portion 60A, serving as a "first non-inflating portion", and a lower side non-inflating portion 60B, serving as a "second non-inflating portion", respectively formed in island shapes and disposed spaced apart from each other in the vehicle up-down direction, and a connecting portion 60C that connects the upper side non-inflating portion 60A and the lower side non-inflating portion 60B together substantially in the vehicle up-down direction. Moreover, as viewed along the vehicle width direction from inside the vehicle cabin, the upper side non-inflating portion 60A is disposed further toward the vehicle front side than the lower side non-inflating portion 60B, and the connecting portion 60C is disposed in a state inclined toward the vehicle front side with respect to the vehicle up-down direction.

Regarding the auxiliary chamber 58, as illustrated in FIG. 3, a tag 40A positioned at a vehicle upper side of the auxiliary chamber 58 and a tag 40B positioned at a vehicle upper side and furthest toward the front of the front side main chamber 48 are coupled together in the vehicle front-rear direction by a strap shaped upper tether 62. The length of the upper tether 62 is set shorter than the length that would be required if the auxiliary chamber 58 were to be disposed so as to form a straight line with the front side main chamber 48 in the vehicle front-rear direction. Accordingly, in a completed state of deployment of the curtain airbag 30, as viewed along the vehicle up-down direction from inside the vehicle cabin (in vehicle plan view with a roof panel and the roof headliner removed), the auxiliary chamber 58 is disposed at a position bent toward the vehicle width direction inner side with respect to the front side main chamber 48 (see FIG. 2A). Note that the auxiliary chamber 58 of the curtain airbag 30 is folded by rolling up or folding into a concertina shape in the vehicle up-down direction after being folded back on itself one or plural times in the vehicle front-rear direction. The tags 40 and the upper tether 62 are omitted from illustration in FIG. 1, etc.

A front end portion of the curtain airbag 30 is coupled to a vehicle body through a front tether 64. Specifically, a front end portion of the front tether 64 is fixed to a front pillar 66 by an attachment bolt 68 or a clip. A rear end portion of the front tether 64 is fixed to the front portion side non-inflating portion 60 by stitching. Note that the front tether 64 is omitted from illustration in FIG. 1, etc.

In the curtain airbag 30 described above, a second gas supply path 70 that places the front side main chamber 48 and the auxiliary chamber 58 in communication with each other in the vehicle front-rear direction is provided at a vehicle lower side of the front portion side non-inflating portion 60. A lower portion of the front side main chamber 48 and a lower portion of the auxiliary chamber 58 are placed in communication with each other through the second gas supply path 70. As viewed along the vehicle width direction from inside the vehicle cabin, a portion (specifically a lower portion) 70A of the second gas supply path 70 is positioned further to the vehicle lower side than a door beltline 72 of the side door 32 on the driver's seat side. However, configuration may be made in which the entire second gas supply path 70 is positioned further to the vehicle lower side than the door beltline 72 of the side door 32 on the driver's seat side.

As illustrated in FIG. 1 and FIG. 3, a lower portion side of the auxiliary chamber 58 described above in the vehicle up-down direction is provided with a lower side extension portion 58A positioned further to the vehicle lower side than the door beltline 72 of the side door 32 on the driver's seat side as viewed along the vehicle width direction from inside the vehicle cabin. Moreover, a lower edge portion of the front side main chamber 48 in the vehicle up-down direction is formed with a recessed portion 74 recessed toward the vehicle upper side and the vehicle rear side with respect to the lower side extension portion 58A of the auxiliary chamber 58. Forming the recessed portion 74 enables interference with an upper portion of a side airbag 76 (see FIG. 1) to be suppressed in cases in which both the curtain airbag 30 and a side airbag device are installed. Note that the double-dotted intermittent lines in FIG. 1 illustrate the inflated and deployed side airbag 76 when a seat position of the vehicle seat is at a frontmost position.

Figure 2A:
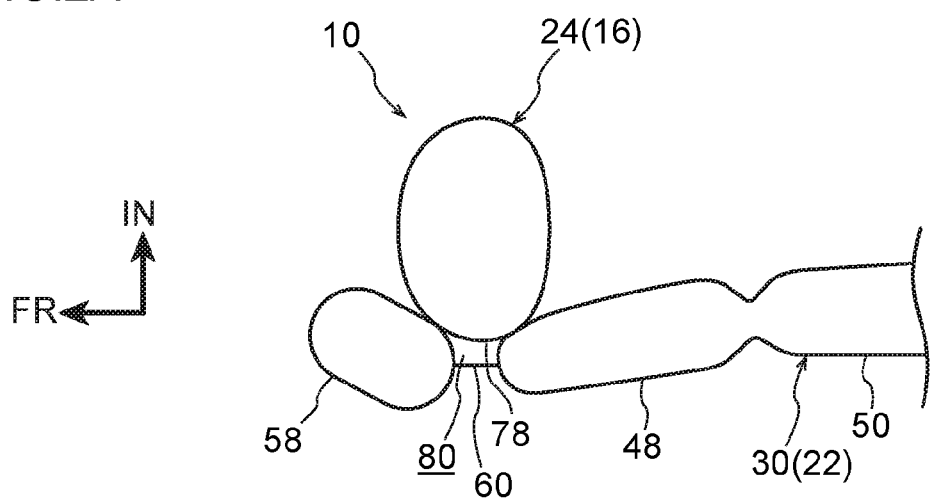
FIG. 2A is a plan view cross-section taken along line 2A-2A in FIG. 1.

Explanation follows regarding a relationship between the placements of the curtain airbag 30 configured as described above and the driver's seat airbag 24. As illustrated in FIG. 2A, the front portion side non-inflating portion 60 of the curtain airbag 30 is disposed at a position facing a maximum external diameter portion 78, where an external diameter of the driver's seat airbag 24 is largest, in the vehicle width direction. Accordingly, a specific gap 80 is formed between the maximum external diameter portion 78 of the driver's seat airbag 24 and the curtain airbag 30 at the position formed with the front portion side non-inflating portion 60. Note that as illustrated in FIG. 3, when a portion of the driver's seat airbag 24 present from a rim of the steering wheel 12 to the side of the occupant (the portion of the driver's seat airbag 24 illustrated by solid lines in FIG. 3) is viewed along the vehicle width direction from inside the vehicle cabin, the "external diameter" referred to here is the length between two points where a straight line running orthogonally to an axial line Q of the portion of the driver's seat airbag 24 present at the side of the occupant intersects a line marking the outer profile of the portion of the driver's seat airbag 24 present at the side of the occupant. The "maximum external diameter" is the length of the line segment P, illustrated by a single-dotted intermittent line in FIG. 3.

Figure 2B:
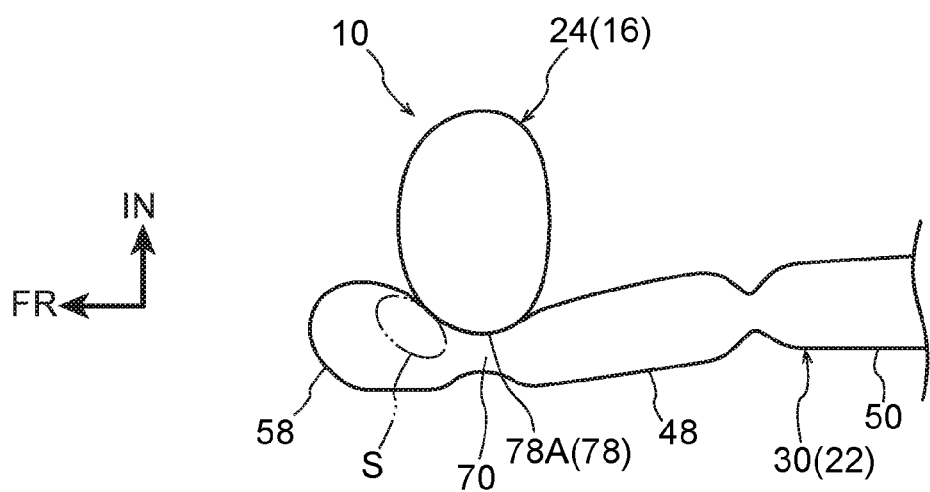
FIG. 2B is a plan view cross-section taken along line 2B-2B in FIG. 1.

As illustrated in FIG. 1 and FIG. 2B, an end portion 78A on the vehicle width direction outer side (see FIG. 2B) of the maximum external diameter portion 78, where the external diameter of the driver's seat airbag 24 is largest, is disposed over the second gas supply path 70 described above when the driver's seat airbag 24 is viewed along the vehicle width direction from inside the vehicle cabin. Note that in FIG. 1, a central position C (a point where the single-dotted intermittent line P indicating the maximum external diameter portion 78 intersects the axial line Q) at the center of the driver's seat airbag 24 is positioned over the second gas supply path 70 when the driver's seat airbag 24 (strictly speaking, the portion of the driver's seat airbag 24 present from the rim of the steering wheel 12 to the side of the occupant, as is clear in FIG. 3) is viewed along the vehicle width direction from inside the vehicle cabin. Note that an external diameter of the second gas supply path 70 is set at a diameter dimension at which interference with the vehicle width direction outer side end portion 78A of the maximum external diameter portion 78 of the driver's seat airbag 24 is suppressed.

Supplementary explanation to the above description follows. A collision at an angle (MDB collision at an angle, oblique collision) is, for example, defined as a collision from the oblique front, as stipulated by NHTSA (as an example, a collision at a relative angle of 15° and with a vehicle width direction overlap amount of approximately 35% with respect to a collision partner). In the present exemplary embodiment, as an example, a collision at an angle at a relative speed of 90 km/h is envisaged. NHTSA is an abbreviation for the US National Highway Traffic Safety Administration.

Operation and Advantageous Effects of the Present Exemplary Embodiment

Next, explanation follows regarding operation and advantageous effects of the present exemplary embodiment.

In the event of a collision at an angle, and in the event of an oblique collision in particular, the inflator of the driver's seat airbag device 16 actuates, and the inflator 28 of the curtain airbag device 22 actuates. Accordingly, both the driver's seat airbag 24 and the curtain airbag 30 are inflated and deployed. In the curtain airbag 30, the front side main chamber 48 inflates and deploys first, and then gas inside the front side main chamber 48 is supplied into the auxiliary chamber 58 through the first gas supply path 46. The auxiliary chamber 58 accordingly inflates and deploys, and the auxiliary chamber 58 is disposed at a position bent toward the vehicle width direction inner side with respect to the front side main chamber 48 as viewed along the vehicle up-down direction from inside the vehicle cabin.

Note that in the present exemplary embodiment, as illustrated in FIG. 2A and FIG. 4, the front portion side non-inflating portion 60 disposed between the front side main chamber 48 and the auxiliary chamber 58 is disposed at a position facing the maximum external diameter portion 78, where the external diameter of the driver's seat airbag 24 is largest, in the vehicle width direction. The gap 80 is accordingly formed between the maximum external diameter portion 78 of the driver's seat airbag 24 and the front portion side non-inflating portion 60. As a result, mutual interference between the driver's seat airbag 24 and the curtain airbag 30 is suppressed, even if the driver's seat airbag 24 and the curtain airbag 30 are increased in size as a countermeasure against collisions at an angle. The inflation and deployment states of both the driver's seat airbag 24 and the curtain airbag 30 are accordingly stable.

Further explanation follows regarding the above advantageous effect, with reference to comparative examples. Note that in the comparative examples, configuration sections similar to those of the configuration of the exemplary embodiment described above are allocated the same reference numerals.

Figure 5A:
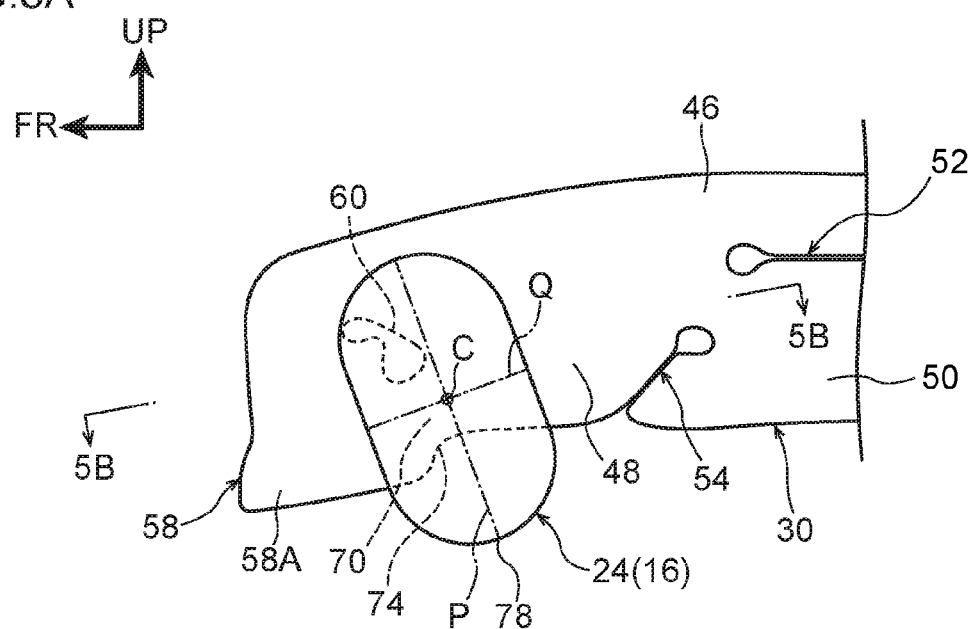
FIG. 5A is a side view corresponding to FIG. 1, and is an explanatory diagram to explain an advantageous effect of an automobile occupant protection device according to the present exemplary embodiment by illustrating a case in which a maximum external diameter portion of a driver's seat airbag is disposed offset toward a vehicle rear side of a front portion side non-inflating portion.
Figure 5B:
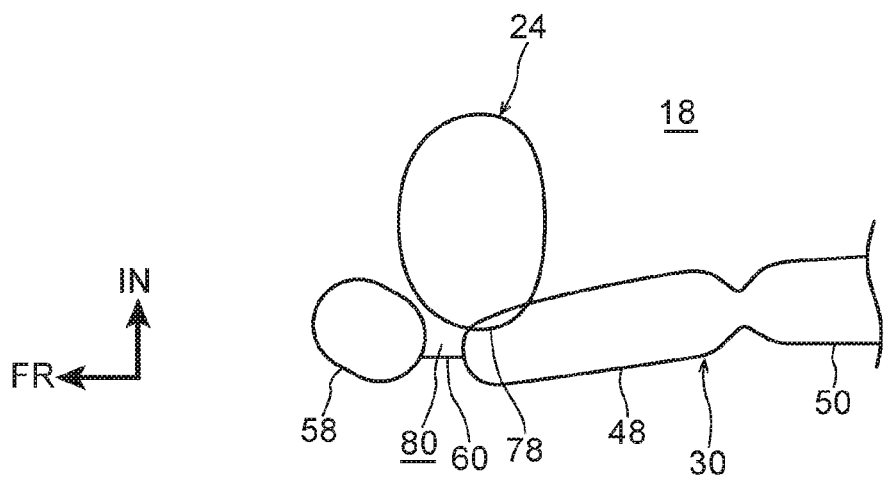
FIG. 5B is a plan view cross-section taken along line 5B-5B in FIG. 5A, and is an explanatory diagram to explain an advantageous effect of an automobile occupant protection device according to the present exemplary embodiment.

If, as illustrated in FIG. 5A and FIG. 5B, the maximum external diameter portion 78 of the driver's seat airbag 24 were offset further to the vehicle rear side than the front portion side non-inflating portion 60, the maximum external diameter portion 78 of the driver's seat airbag 24 would interfere with the front side main chamber 48. The inflation and deployment states of both the driver's seat airbag 24 and the curtain airbag 30 would therefore be unstable.

Figure 6A:
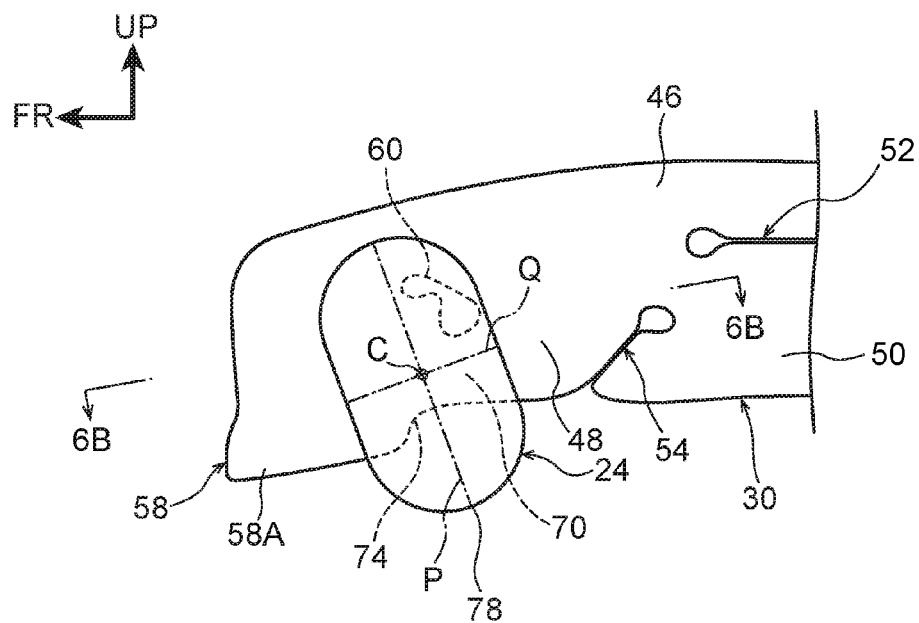
FIG. 6A is a side view corresponding to FIG. 5A, and is an explanatory diagram to explain an advantageous effect of an automobile occupant protection device according to the present exemplary embodiment by illustrating a case in which a maximum external diameter portion of a driver's seat airbag is disposed offset toward a vehicle front side of a front portion side non-inflating portion.
Figure 6B:
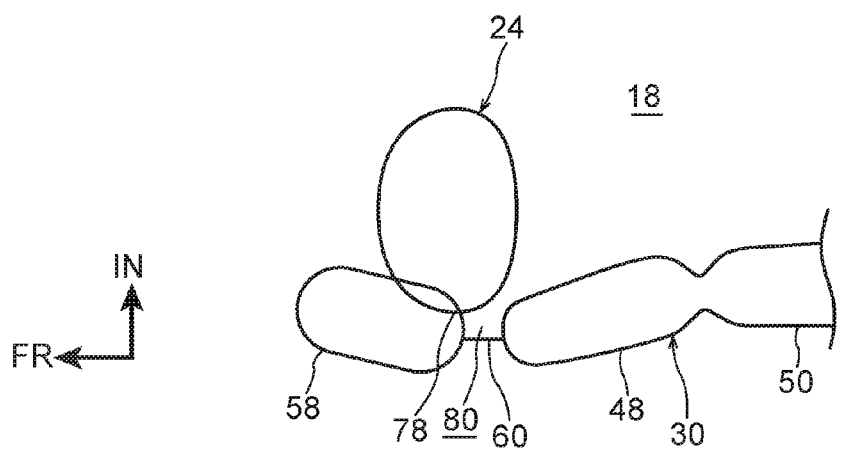
FIG. 6B is a plan view cross-section taken along line 6B-6B in FIG. 6A, and is an explanatory diagram to explain an advantageous effect of an automobile occupant protection device according to the present exemplary embodiment.

As illustrated in FIG. 6A and FIG. 6B, similar would apply if the maximum external diameter portion 78 of the driver's seat airbag 24 were offset further to the vehicle front side than the front portion side non-inflating portion 60. In such cases, the maximum external diameter portion 78 of the driver's seat airbag 24 would interfere with the auxiliary chamber 58. The inflation and deployment states of both the driver's seat airbag 24 and the curtain airbag 30 would therefore be unstable.

By contrast, in the present exemplary embodiment, since the front portion side non-inflating portion 60 is disposed at a position facing the maximum external diameter portion 78 of the driver's seat airbag 24 in the vehicle width direction, the gap 80 is formed between the maximum external diameter portion 78 of the driver's seat airbag 24 and the front portion side non-inflating portion 60. Mutual interference between the driver's seat airbag 24 and the curtain airbag 30 is thereby suppressed, and the inflation and deployment states of both the driver's seat airbag 24 and the curtain airbag 30 are stable.

Accordingly, in the present exemplary embodiment, in the event of a collision at an angle, and in the event of an oblique collision in particular, the inflation and deployment states of both the driver's seat airbag 24 and the curtain airbag 30 are stable, thereby enabling improved head protection performance of a seated occupant.

Moreover, in the present exemplary embodiment, the second gas supply path 70 that places the front side main chamber 48 and the auxiliary chamber 58 in communication with each other along the vehicle front-rear direction is provided at a vehicle lower side of the front portion side non-inflating portion 60 in the curtain airbag 30. This thereby enables the following operation and advantageous effects to be obtained.

In the event of a collision at an angle, and in the event of an oblique collision in particular, the head of the seated occupant moves obliquely toward the vehicle front side and the vehicle width direction outer side under inertia. The head of the seated occupant therefore contacts the vicinity of the end portion 78A on the vehicle width direction outer side of the maximum external diameter portion 78 of the driver's seat airbag 24.

Figure 7A:
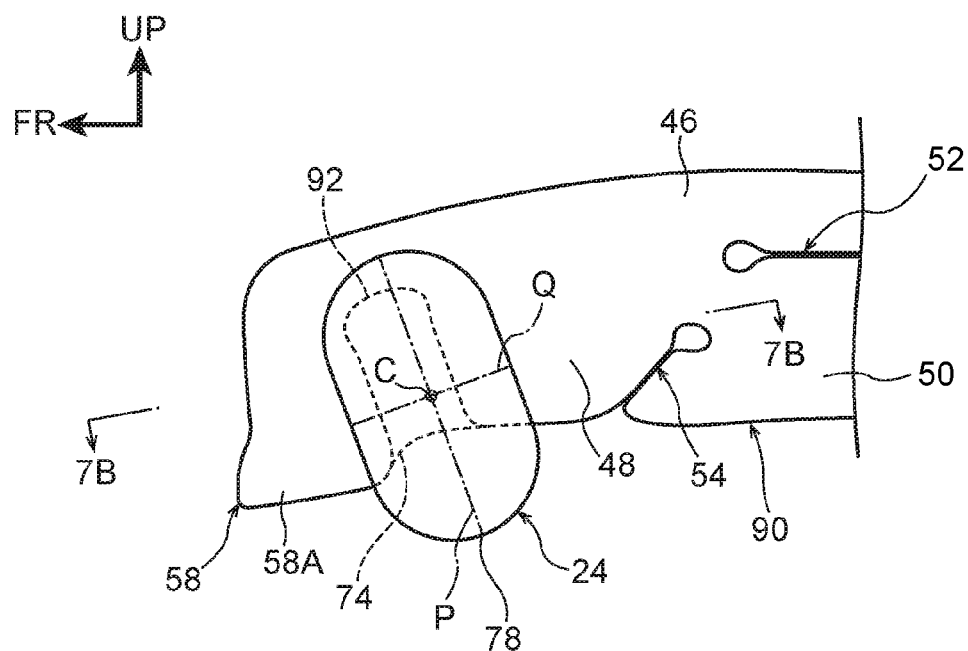
FIG. 7A is a side view corresponding to FIG. 5A, and is an explanatory diagram to explain an advantageous effect of an automobile occupant protection device according to the present exemplary embodiment by illustrating a case in which a front portion side non-inflating portion of a curtain airbag is extended as far as a lower edge, and a gap is formed at a back face side of a maximum external diameter portion of a driver's seat airbag.
Figure 7B:
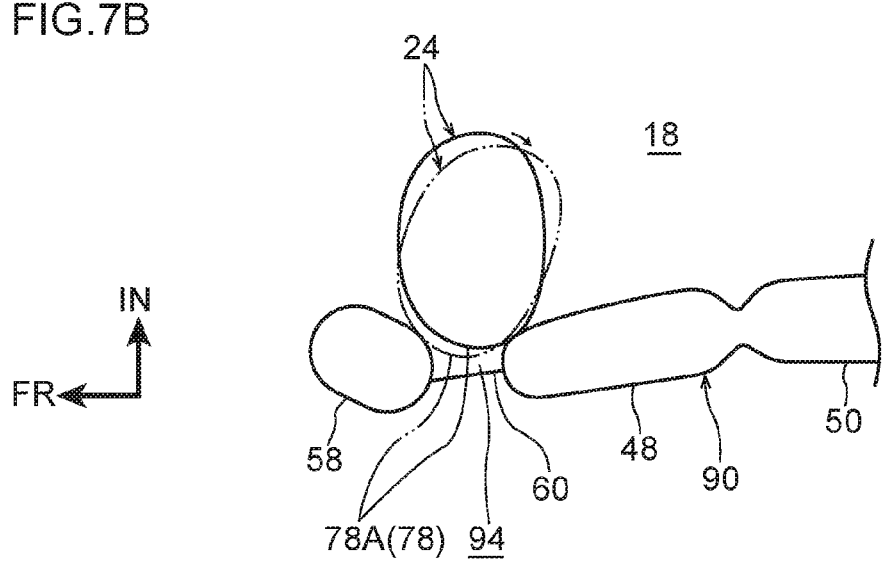
FIG. 7B is a plan view cross-section taken along line 7B-7B in FIG. 7A, and is an explanatory diagram to explain an advantageous effect of an automobile occupant protection device according to the present exemplary embodiment.

Suppose that a gap present between a driver's seat airbag and the curtain airbag as a countermeasure against interference between the driver's seat airbag and the curtain airbag were too large. Namely, suppose that as in a curtain airbag 90 illustrated in FIG. 7A and FIG. 7B, a front portion side non-inflating portion 92 were extended to a lower edge and a gap 94 were present at a back face side (vehicle front side) of the end portion 78A on the vehicle width direction outer side of the maximum external diameter portion 78 of the driver's seat airbag 24. In such cases, when restraining the head of the seated occupant with the driver's seat airbag in a collision at an angle, the end portion 78A on the vehicle width direction outer side of the maximum external diameter portion 78 of the driver's seat airbag 24 would be pressed by the head of the seated occupant, and the driver's seat airbag 24 would twist (see the driver's seat airbag 24 illustrated by double-dotted intermittent lines in FIG. 7B). As a result, the driver's seat airbag 24 would not adequately exhibit its inherent head restraint performance, and the restraint of the head of the seated occupant by the driver's seat airbag 24 would be inefficient. However, the exemplary embodiment illustrated in FIG. 7A and FIG. 7B is still an exemplary embodiment of the present disclosure, since the front portion side non-inflating portion 92 faces the maximum external diameter portion 78 of the driver's seat airbag 24 in the vehicle width direction.

By contrast, in the present exemplary embodiment, as illustrated in FIG. 1, the second gas supply path 70 that places the front side main chamber 48 and the auxiliary chamber 58 in communication with each other along the vehicle front-rear direction is provided at the vehicle lower side of the front portion side non-inflating portion 60 in the curtain airbag 30, such that the second gas supply path 70 is present at a location where the gap 94 would otherwise form. Accordingly, when the end portion 78A on the vehicle width direction outer side of the maximum external diameter portion 78 of the driver's seat airbag 24 is pressed toward the vehicle front side by the head of the seated occupant, the auxiliary chamber 58 of the curtain airbag 30 at a back side (vehicle front side) of the end portion 78A on the vehicle width direction outer side contacts a back face of the end portion 78A on the vehicle width direction outer side at an early stage. The end portion 78A on the vehicle width direction outer side of the maximum external diameter portion 78 of the driver's seat airbag 24 is accordingly supported from the vehicle front side by a region S (see FIG. 2B) of the auxiliary chamber 58 of the curtain airbag 30 from an early stage, thereby suppressing the driver's seat airbag 24 from twisting, and rapidly increasing a reaction force of the driver's seat airbag 24.

As a result, the present exemplary embodiment enables both stable inflation and deployment states of both the driver's seat airbag 24 and the curtain airbag 30, and efficient restraint of the head of the seated occupant. Note that a further advantageous effect of providing the second gas supply path 70 is the point that, in the event of a collision at an angle, and in particular, in the event of an oblique collision, gas is supplied through the second gas supply path 70 in addition to the gas supplied through the first gas supply path 46, thereby enabling rapid inflation and deployment of the auxiliary chamber 58.

Figure 8A:
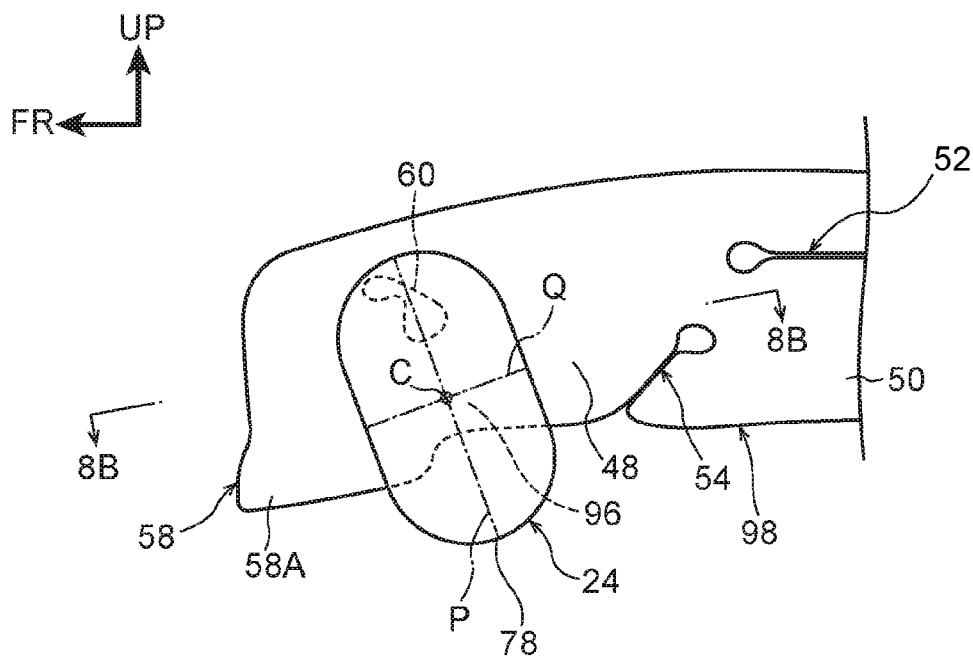
FIG. 8A is a side view corresponding to FIG. 5A, and is an explanatory diagram to explain an advantageous effect of an automobile occupant protection device according to the present exemplary embodiment by illustrating a case in which an external diameter of a second gas supply path of a curtain airbag is too large.
Figure 8A:
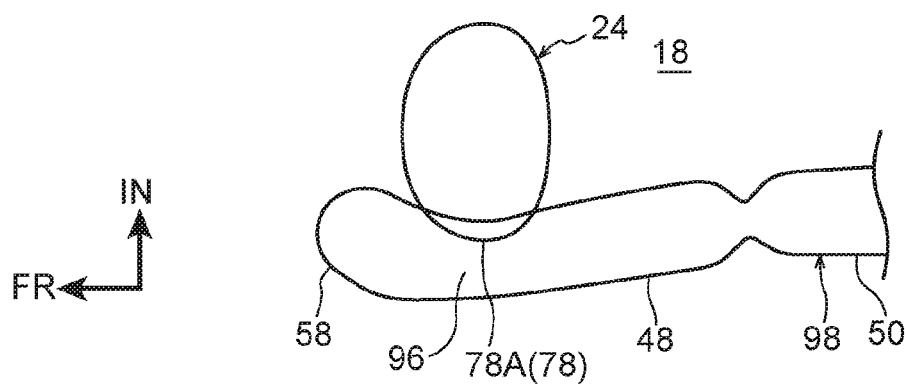

As illustrated in FIG. 8A and FIG. 8B, if the external diameter of a second gas supply path 96 is too large, a curtain airbag 98 and the driver's seat airbag 24 interfere with each other, and so it is obviously not desirable to provide a second gas supply path 96 with too large an external diameter. However, the exemplary embodiment illustrated in FIG. 8A and FIG. 8B is still an exemplary embodiment of the present disclosure, since the front portion side non-inflating portion 60 faces the maximum external diameter portion 78 of the driver's seat airbag 24 in the vehicle width direction.

Moreover, in the present exemplary embodiment, the end portion 78A on the vehicle width direction outer side of the maximum external diameter portion 78, where the external diameter of the driver's seat airbag 24 is largest, is disposed over the second gas supply path 70 when the driver's seat airbag 24 is viewed along the vehicle width direction from inside the vehicle cabin, thereby enabling the location of the largest external diameter to be supported from the vehicle front side. The driver's seat airbag 24 is thereby efficiently suppressed from twisting. The present exemplary embodiment thereby enables the advantageous effect of efficiently restraining the head of the seated occupant to be further enhanced as a result.

In the present exemplary embodiment, as viewed along the vehicle width direction from inside the vehicle cabin, at least the portion 70A of the second gas supply path 70 is positioned further to the vehicle lower side than the door beltline 72 of the side door 32 on the driver's seat side. Accordingly, when the seated occupant gives the curtain airbag 30 a hard push toward the vehicle width direction outer side, the curtain airbag 30 obtains a reaction force from a door trim in the vicinity of the door beltline 72 of the side door 32 on the driver's seat side through the second gas supply path 70.

Figure 9A:
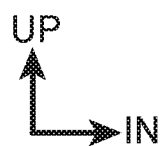
FIG. 9A is a vertical cross-section illustrating a state of an impactor prior to making contact, and is an explanatory diagram to explain an advantageous effect of an automobile occupant protection device according to the present exemplary embodiment by illustrating a case in which a front portion side non-inflating portion of a curtain airbag is extended as far as a lower edge, and a second gas supply path is not formed.
Figure 9A:
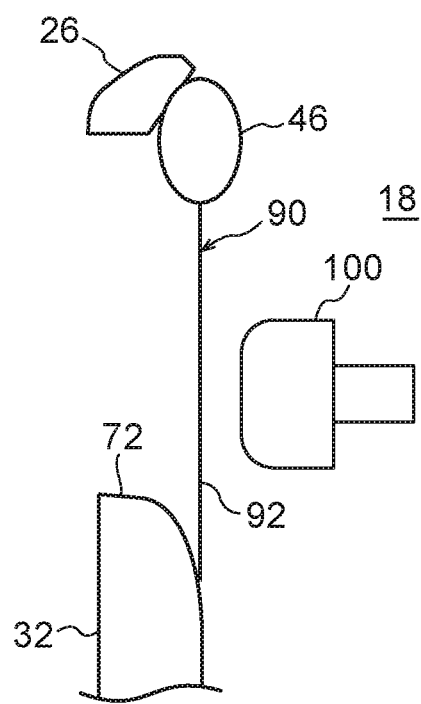
Figure 9B:
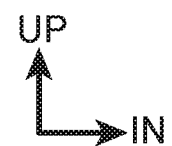
FIG. 9B is a vertical cross-section illustrating a state of an impactor after making contact, and is an explanatory diagram to explain an advantageous effect of an automobile occupant protection device according to the present exemplary embodiment.
Figure 9B:
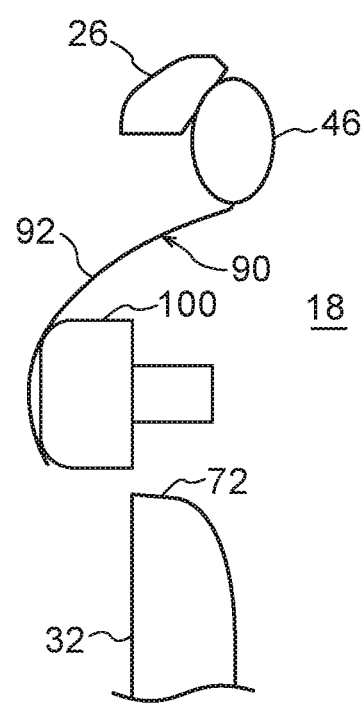

Namely, if the front portion side non-inflating portion 92 were extended to a lower edge as in the curtain airbag 90 illustrated in FIG. 7A, described above, then as illustrated in FIG. 9A and FIG. 9B, when an impactor 100 simulating the head of the seated occupant presses the curtain airbag 90 toward the vehicle width direction outer side from the vehicle cabin inside, it is difficult to obtain a reaction force from the door trim in the vicinity of the door beltline 72 of the side door 32 on the driver's seat side. However, the exemplary embodiment illustrated in FIG. 9A and FIG. 9B is still an exemplary embodiment of the present disclosure, since the front portion side non-inflating portion 92 faces the maximum external diameter portion 78 of the driver's seat airbag 24 in the vehicle width direction.

Figure 10A:
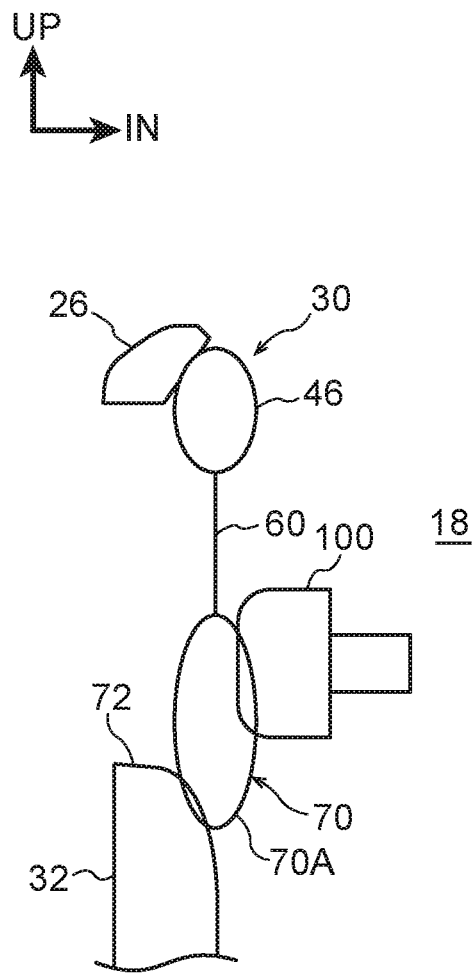
FIG. 10A is a vertical cross-section illustrating a state of an impactor prior to making contact, and is an explanatory diagram to explain an advantageous effect of an automobile occupant protection device according to the present exemplary embodiment by illustrating a case in which a second gas supply path is formed at a vehicle lower side of a front portion side non-inflating portion of a curtain airbag, and at least a portion of the second gas supply path is disposed further to the vehicle lower side than a door beltline.
Figure 10B:
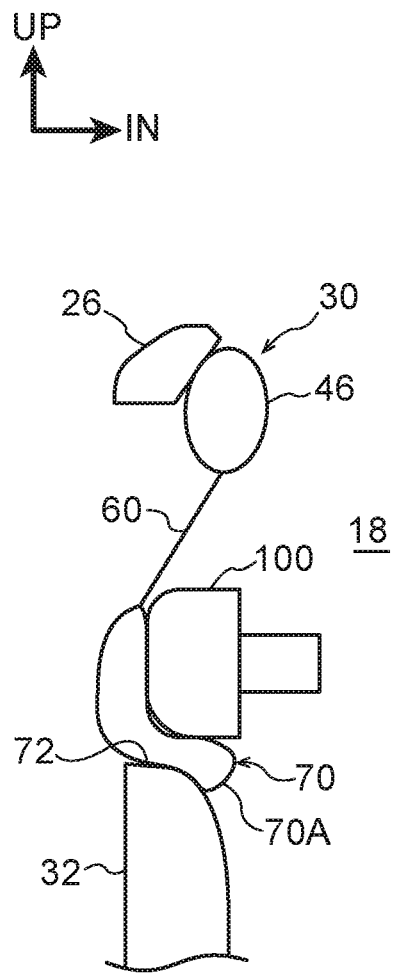
FIG. 10B is a vertical cross-section illustrating a state of an impactor after making contact, and is an explanatory diagram to explain an advantageous effect of an automobile occupant protection device according to the present exemplary embodiment.

By contrast, as illustrated in FIG. 10A and FIG. 10B, since at least the portion 70A of the second gas supply path 70 is positioned further to the vehicle lower side than the door beltline 72 of the side door 32 on the driver's seat side as viewed along the vehicle width direction from inside the vehicle cabin, when the impactor 100 presses the curtain airbag 30, the curtain airbag 30 readily obtains a reaction force from the door trim in the vicinity of the door beltline 72 of the side door 32 on the driver's seat side through the second gas supply path 70. As a result, the present exemplary embodiment enables ejection of the occupant from the vehicle to be effectively suppressed in the event of a collision at an angle, and in particular in the event of an oblique collision.

In the present exemplary embodiment, as viewed along the vehicle width direction from inside the vehicle cabin, the lower side extension portion 58A that is positioned further to the vehicle lower side than the door beltline 72 of the side door 32 on the driver's seat side is provided at a lower portion side of the auxiliary chamber 58 in the vehicle up-down direction. Accordingly, when the seated occupant gives the curtain airbag 30 a hard push toward the vehicle width direction outer side, the curtain airbag 30 obtains a reaction force from the door trim in the vicinity of the door beltline 72 through the lower side extension portion 58A. As a result, the present exemplary embodiment enables ejection of the occupant from the vehicle to be effectively suppressed in the event of a collision at an angle, and in particular in the event of an oblique collision.

In the present exemplary embodiment, the recessed portion 74 that is recessed toward the vehicle upper side and the vehicle rear side with respect to the lower side extension portion 58A of the auxiliary chamber 58 is provided at a vehicle up-down direction lower edge side of the front side main chamber 48, thereby enabling interference with the upper portion of the side airbag 76 to be suppressed in cases in which the side airbag device is installed. Accordingly, the present exemplary embodiment enables not only stabilization of the inflation and deployment states of the driver's seat airbag 24 and the curtain airbag 30, but also stabilization of the inflation and deployment states of the curtain airbag 30 and the side airbag 76 in the event of a collision at an angle, and in particular in the event of an oblique collision.

In the present exemplary embodiment, the front portion side non-inflating portion 60 is configured by the upper side non-inflating portion 60A and the lower side non-inflating portion 60B that are respectively formed in island shapes, and the connecting portion 60C. As viewed along the vehicle width direction from inside the vehicle cabin, the upper side non-inflating portion 60A is disposed further to the vehicle front side than the lower side non-inflating portion 60B, and the connecting portion 60C is disposed in a state inclined toward the vehicle front side with respect to the vehicle up-down direction. This thereby enables a side-on collision head protection area (see the region X in FIG. 1) to be secured at the vehicle rear side of the connecting portion 60C when the seated occupant is a female of small physical build (an AF05 dummy; a crash test dummy of an American adult female in the fifth percentile), and the vehicle seat has been slid to its frontmost position. Moreover, in cases in which the seated occupant is a male of standard physical build (an AM50 dummy; a crash test dummy of an American adult male in the fiftieth percentile), in the event of a collision at an angle, and in particular in the event of an oblique collision, the region Y of the auxiliary chamber 58 that supports the end portion 78A on the vehicle width direction outer side can be sufficiently inflated when the end portion 78A on the vehicle width direction outer side of the driver's seat airbag 24 is supported by the auxiliary chamber 58 and restrains the head of the seated occupant. As a result, the present exemplary embodiment enables high head protection performance to be maintained for occupants of various physical builds, while reducing the amount of gas needed to inflate and deploy the curtain airbag 30.

Supplementary Explanation of the Above Exemplary Embodiment

In the present exemplary embodiment described above, the second gas supply path 70 is provided at the vehicle lower side of the front portion side non-inflating portion 60; however, there is no limitation thereto, and configuration may be made in which the second gas supply path is not provided.

In the exemplary embodiment described above, the end portion 78A on the vehicle width direction outer side of the maximum external diameter portion 78, where the external diameter of the driver's seat airbag 24 is largest, is disposed over the second gas supply path 70 when the driver's seat airbag 24 is viewed along the vehicle width direction from inside the vehicle cabin. However, there is no limitation thereto, and configuration may be made in which the vehicle width direction outer side end portion of the maximum external diameter portion is not disposed over a second gas supply path. For example, configuration may be made in which the lower side non-inflating portion 60B of the front portion side non-inflating portion 60 extends toward the vehicle lower side as far as a position beyond the central position C of the driver's seat airbag 24, and a second gas supply path with a small diameter is formed at the vehicle lower side of the lower side non-inflating portion.

In the present exemplary embodiment described above, as viewed along the vehicle width direction from inside the vehicle cabin, at least the portion 70A of the second gas supply path 70 is positioned further to the vehicle lower side than the door beltline 72 of the side door 32 on the driver's seat side. However, there is no limitation thereto, and configuration may be made in which the entire second gas supply path is positioned further to the vehicle upper side than the door beltline of the side door on the driver's seat side.

In the present exemplary embodiment described above, as viewed along the vehicle width direction from inside the vehicle cabin, at the lower portion side of the auxiliary chamber 58 in the vehicle up-down direction, the lower side extension portion 58A is provided at a position further to the vehicle lower side than the door beltline 72 of the side door 32 on the driver's seat side. However, there is no limitation thereto, and configuration may be made in which the lower side extension portion 58A is not provided.

In the present exemplary embodiment described above, the recessed portion 74 that is recessed toward the vehicle upper side and the vehicle rear side with respect to the lower side extension portion 58A of the auxiliary chamber 58 is formed at the vehicle up-down direction lower edge side of the front side main chamber 48. However, there is no limitation thereto, and configuration may be made in which a recessed portion is not formed.

In the present exemplary embodiment described above, the front portion side non-inflating portion 60 is configured including the upper side non-inflating portion 60A and the lower side non-inflating portion 60B that are each formed in an island shape and disposed spaced apart from each other in the vehicle up-down direction, and the connecting portion 60C that connects the upper side non-inflating portion 60A and the lower side non-inflating portion 60B together substantially in the vehicle up-down direction. However, there is no limitation thereto, and a "non-inflating portion" may be configured with a different shape to that described above. Accordingly, as described previously, the curtain airbag 90 in which the front portion side non-inflating portion 92 is formed extending as far as the lower edge is still an exemplary embodiment of the present disclosure. Moreover, in the present exemplary embodiment, as viewed along the vehicle width direction from inside the vehicle cabin, the upper side non-inflating portion 60A is disposed further to the vehicle front side than the lower side non-inflating portion 60B, and the connecting portion 60C is disposed in a state inclined toward the vehicle front side with respect to the vehicle up-down direction. However, there is no limitation thereto, and configuration may be made in which the connecting portion is not inclined toward the vehicle front side with respect to the vehicle up-down direction.

What is claimed is:

1. An automobile occupant protection device for a vehicle having a front pillar, the automobile occupant protection device comprising:
    a driver's seat airbag that is provided at a steering wheel, and that is configured by a bag body that has a substantially flattened spherical shape in a state in which deployment has been completed in the event of a collision at an angle; and
    a curtain airbag that is provided behind a ceiling of a vehicle cabin and that includes:
        a main chamber configured by a bag body that has a curtain shape disposed at a vehicle width direction inner side of a side window on a driver's seat side in a state in which deployment has been completed in the event of a collision at an angle,
        an auxiliary chamber that is provided at a vehicle front side of the main chamber and that is disposed at a position bent toward the vehicle width direction inner side with respect to the main chamber as viewed along a vehicle up-down direction from an inner side of the vehicle cabin in a state in which deployment has been completed,
        a non-inflating portion that is disposed between the main chamber and the auxiliary chamber, and
        a first gas supply path that is provided at a vehicle up-down direction upper side of the non-inflating portion and that is capable of supplying gas from the main chamber to the auxiliary chamber;
    wherein the non-inflating portion is disposed at a position facing, in the vehicle width direction, a maximum external diameter portion of the driver's seat airbag at which an external diameter of the driver's seat airbag is largest, and an entire area of the non-inflating portion overlaps with the driver's seat airbag in a side view.

2. The automobile occupant protection device of claim 1, wherein a second gas supply path that places the main chamber and the auxiliary chamber in communication with each other along a vehicle front-rear direction is provided at the curtain airbag at a vehicle lower side of the non-inflating portion.

3. The automobile occupant protection device of claim 2, wherein an end portion at a vehicle width direction outer side, of the maximum external diameter portion at which the external diameter of the driver's seat airbag is largest, is disposed over the second gas supply path when the driver's seat airbag is viewed along the vehicle width direction from inside the vehicle cabin.

4. The automobile occupant protection device of claim 2, wherein, as viewed along the vehicle width direction from inside the vehicle cabin, at least a portion of the second gas supply path is positioned further to the vehicle lower side than a door beltline of a side door on the driver's seat side.

5. The automobile occupant protection device of claim 1, wherein, as viewed along the vehicle width direction from inside the vehicle cabin, a lower portion side of the auxiliary chamber in the vehicle up-down direction is provided with a lower side extension portion that is positioned further to a vehicle lower side than a door beltline of a side door on the driver's seat side.

6. The automobile occupant protection device of claim 5, wherein a lower edge side of the main chamber in the vehicle up-down direction is formed with a recessed portion recessed toward a vehicle upper side and a vehicle rear side with respect to the lower side extension portion of the auxiliary chamber.

7. The automobile occupant protection device of claim 1, wherein:
- the non-inflating portion is configured including a first non-inflating portion and a second non-inflating portion that are disposed spaced apart from each other in the vehicle up-down direction, and a connecting portion that connects the first non-inflating portion and the second non-inflating portion together substantially in the vehicle up-down direction; and
- as viewed along the vehicle width direction from inside the vehicle cabin, the first non-inflating portion is disposed further to the vehicle front side than the second non-inflating portion, and the connecting portion is disposed in a state inclined toward the vehicle front side with respect to the vehicle up-down direction.

* * * * *